(12) United States Patent
Partouche et al.

(10) Patent No.: US 12,012,198 B2
(45) Date of Patent: Jun. 18, 2024

(54) PRESSURE BULKHEAD

(71) Applicants: Airbus SAS, Blagnac (FR); Airbus Operations S.L., Getafe (ES); Airbus Operations GmbH, Hamburg (DE)

(72) Inventors: Laure Partouche, Getafe (ES); John Arthur Jones, Blagnac (FR); Christopher Holmes, Blagnac (FR); Wouter Brok, Blagnac (FR); Ralf Reinhold, Hamburg (DE); Adolfo Avila Gutierrez, Getafe (ES)

(73) Assignees: Airbus SAS, Blagnac (FR); Airbus Operations S.L., Getafe (ES); Airbus Operations GmbH, Hamburg (DE)

( * ) Notice: Subject to any disclaimer, the term of this patent is extended or adjusted under 35 U.S.C. 154(b) by 373 days.

(21) Appl. No.: 16/940,719

(22) Filed: Jul. 28, 2020

(65) Prior Publication Data
US 2021/0031900 A1     Feb. 4, 2021

(30) Foreign Application Priority Data

Jul. 30, 2019 (EP) ..................................... 19382653

(51) Int. Cl.
*B64C 1/10* (2006.01)
*B64C 1/06* (2006.01)
(Continued)

(52) U.S. Cl.
CPC ............... *B64C 1/10* (2013.01); *B64C 1/061* (2013.01); *B64C 1/064* (2013.01); *B64C 1/068* (2013.01);
(Continued)

(58) Field of Classification Search
CPC .......... B64C 1/10; B64C 1/061; B64C 1/064; B64C 1/068; B64C 1/069; B64C 1/26; B64C 5/02; B64C 1/06
See application file for complete search history.

(56) References Cited

U.S. PATENT DOCUMENTS

| | | | |
|---|---|---|---|
| 1,669,592 A * | 5/1928 | Arnstein ................... | B64B 1/00 244/125 |
| 4,728,059 A | 3/1988 | Stephen et al. | |

(Continued)

FOREIGN PATENT DOCUMENTS

| | | | |
|---|---|---|---|
| CA | 3042645 A1 * | 12/2019 | ............... B64C 1/10 |
| DE | 3844080 A1 | 7/1990 | |

(Continued)

OTHER PUBLICATIONS

European Search Report; priority document.

*Primary Examiner* — Assres H Woldemaryam
(74) *Attorney, Agent, or Firm* — Greer, Burns & Crain, Ltd.

(57) ABSTRACT

A rear pressure bulkhead comprising a dome shaped structure, and a set of built-in extension components ("petals") homogeneously distributed along the periphery of the dome-shaped structure. This results in the dome-shaped structure being secured to a frame of the aircraft, while the extension components are secured to longitudinal structures of the aircraft. An aircraft rear fuselage is provided including such a rear pressure bulkhead so that the available cabin space, i.e., pressurized space, is extended without enlarging the fuselage.

14 Claims, 5 Drawing Sheets

(51) Int. Cl.
*B64C 1/26* (2006.01)
*B64C 5/02* (2006.01)

(52) U.S. Cl.
CPC .............. *B64C 1/069* (2013.01); *B64C 1/26* (2013.01); *B64C 5/02* (2013.01)

(56) References Cited

U.S. PATENT DOCUMENTS

| | | | | |
|---|---|---|---|---|
| 5,899,412 | A * | 5/1999 | DiIorio | B64C 1/10 244/119 |
| 8,596,578 | B2 * | 12/2013 | Noebel | B64C 1/10 244/119 |
| 9,637,215 | B2 * | 5/2017 | Joern | B64C 1/064 |
| 9,776,704 | B1 * | 10/2017 | Rufino | B64C 1/10 |
| 10,173,765 | B2 * | 1/2019 | Jerstad | B64C 1/069 |
| 10,384,759 | B2 * | 8/2019 | Zuardy | B64C 1/064 |
| 10,926,857 | B2 * | 2/2021 | McNamara | B64C 1/069 |
| 2011/0233334 | A1 | 9/2011 | Stephan | |
| 2011/0290940 | A1 * | 12/2011 | Noebel | B64C 1/10 244/121 |
| 2019/0210706 | A1 | 7/2019 | Zeeb et al. | |

FOREIGN PATENT DOCUMENTS

| | | | | |
|---|---|---|---|---|
| DE | 102016216527 | A1 | 3/2018 | |
| EP | 0217117 | A1 | 4/1987 | |
| EP | 2813425 | A1 * | 12/2014 | ............ B62D 25/00 |
| EP | 3075650 | A1 * | 10/2016 | ............ B64C 1/061 |
| RU | 2190556 | C2 | 10/2002 | |
| WO | WO-0020765 | A2 * | 4/2000 | ........... B29C 65/562 |
| WO | WO-0104001 | A2 * | 1/2001 | .............. B64C 1/10 |

* cited by examiner

PRESSURE BULKHEAD

CROSS-REFERENCES TO RELATED APPLICATIONS

This application claims the benefit of the European patent application No. 19382653.4 filed on Jul. 30, 2019, the entire disclosures of which are incorporated herein by way of reference.

FIELD OF THE INVENTION

The present invention belongs to the field of aircraft parts, and particularly, it relates to the configuration and location of rear pressure bulkheads.

Specifically, the invention is encompassed within the incremental development programs of commercial aircraft wherein typically the pressurized space—such as the cabin—tends to be extended by enlarging the size of the fuselage. Unlike such solutions, the present invention provides a structural modification of the rear pressure bulkhead in order to gain such pressurized space without enlarging the size of the aircraft fuselage.

BACKGROUND OF THE INVENTION

Typically, an aircraft fuselage is divided into a pressurized space and a non-pressurized space, wherein this separation is demarcated by the rear pressure bulkhead. The pressurized space is designed to carry the passengers while the non-pressurized space—such as the rear part of the aircraft—houses the nonpropulsive power plant such as the Auxiliary Power Unit, APU.

Accordingly, the rear pressure bulkhead interposed therebetween should ensure a correct air-tightness during all flight phases withstanding the varying pressure differences, which may reach up to about 1300 hPa.

Due to its high safety requirements and great impact in structural design, the rear pressure bulkhead is addressed at the early stages of any aircraft design process, thus making extremely difficult any future major structural change thereof. Accordingly, its location is inextricably bound to the available cabin space, being necessary to enlarge the fuselage in order to gain the additional cabin space.

To better integrate this structural element in the overall fuselage manufacturing, the aircraft fuselage is typically manufactured in different parts that will be assembled together forming two main fuselage sections: a forward fuselage to be pressurized at high altitude, and a non-pressurized rear fuselage. These two separate sections are virtually separated by an orbital fuselage joint connection which structurally dissociates one section from the other.

One of the reasons for this dissociation is because of the structural loads induced by the Vertical Tail Plane, VTP, (as well as the Horizontal Tail Plane, HTP) which is typically attached by tension bolts to the foremost frames (3-4 strengthening frames) of the non-pressurized rear fuselage. These strengthening frames are normally wider and thicker in the upper part, i.e., closer to the VTP, in order to adequately withstand the loads induced therefrom. Thus, these strengthening frames leave a substantially ovoid contour.

Nowadays, current rear pressure bulkheads, which comprise a substantially circular composite part, either flat or slightly curved, are attached to a circumferential frame of the fuselage through a continuous circumferential angled fitting which serves as a common point between the perimeter of the rear pressure bulkheads and the inner part of the continuous frame.

For an effective load transmission from the rear pressure bulkhead towards the frame to be achieved, the rear pressure bulkhead should have a substantially homogeneous contour. Otherwise, the rear pressure bulkhead shall be reinforced with stringers such as 'omega-stringers.'

It is to be noted that, in vessel distribution stress, the rear pressure bulkhead receives static pressure from pressurized air (i.e., radial stresses normal to the rear pressure bulkhead plane) and redistributes it in the form of tangential stresses (i.e., coplanar with such plane). Then, these tangential stresses are transferred from the rear pressure bulkhead to the frame where it is attached to via the circumferential angled fitting. The more uniform the distribution is (for instance, by a quasi-circular frame), the better the load transferring may be.

Consequently, current solutions of rear pressure bulkheads are arranged before the orbital fuselage joint connection, that is, in the forward fuselage, particularly attached to the last frame thereof.

Accordingly, any attempt to increase the pressurized cabin entails the enlargement of the forward fuselage.

Hence, there is a need in the aeronautical industry to increase pressurized cabin without modifying the overall length of the aircraft, that is, taken the respective current forward and rear fuselage lengths as design constraints.

SUMMARY OF THE INVENTION

The present invention provides a solution for the aforementioned problems, by a rear pressure bulkhead, a rear fuselage of an aircraft, and an aircraft.

In a first inventive aspect, the invention provides a rear pressure bulkhead for an aircraft configured to separate a pressurized area and a non-pressurized area, wherein the rear pressure bulkhead comprises:

a dome-shaped structure, and a set of built-in extension components distributed along the periphery of the dome-shaped structure, wherein the dome-shaped structure comprises a ring-shaped attachment area adapted to secure the dome-shaped structure either to a circumferential frame of the aircraft or to another circumferential structure, and wherein the extension components comprise attachment means adapted to secure each extension component to a longitudinal structure of the aircraft.

That is, the dome-shaped structure is the main structure separating the pressurized area (i.e., the cabin where passengers are carried) and the nonpressurized area wherein power equipment such as the APU is installed.

In particular, in use, the concave surface of the dome-shaped structure faces the pressurized area while the convex surface faces the non-pressurized area. By this way, the pressurized air exerts pressure homogeneously over the entire concave surface.

Each built-in extension component may be understood as an additional length projecting outwards with the original geometrical surface of the dome, thus providing structural continuity. Geometrically, in cross-section, they extend tangentially from the periphery, i.e., the edge, of the dome-shaped structure.

Preferably, the extension component may be coplanar with the original geometrical surface, i.e., contained within the same geometrical space of a dome. That is, the extension components do not deviate in an abrupt manner from the dome-curvature in cross-section but keep the same curvature as the dome shaped structure.

In a preferred embodiment, the set of built-in extension components are homogeneously distributed along the periphery of the dome-shaped structure.

Their homogeneous distribution along the periphery of the dome-shaped structure corresponds with the number and location of the beams or longerons of the aircraft once installed. As it will be described hereinafter, beams or longerons are longitudinal (i.e., parallel to the fuselage longitudinal axis) structures of the aircraft.

Once installed in the aircraft, the dome-shaped structure rests on the at least one circumferential frame of the aircraft, particularly, such circumferential frame comprises, totally or partially in its contour, an angled head to accommodate the dome geometry so that load transfer between them can be improved. In particular, tangential stresses from the dome-shaped structure reach the ring-shaped attachment area which provides a preferred path for load releasing towards the frame of the aircraft. Once the loads pass to the frame, they distribute radially (in terms of aircraft reference axis) due to the angled head towards other adjacent structures.

Through this entire document, when referring to a 'circumferential' frame, it will be understood as a structural part whose outer geometry corresponds with the periphery of the cross section of the fuselage where the frame is to be mounted. Therefore, as most of commercial aircraft has a substantially circular fuselage, it is provided with a substantially circular structure.

It is to be noted that both longitudinal and circumferential structures such as longerons and beams, respectively, jointly form the primary structure of the aircraft fuselage (either forward or rear fuselage) which provides aero-shape to the outer skin to which they are joined.

As it will be described later on, in advantageous embodiments, this circumferential frame may also comprise an angled fitting to act as an angled head in those portions of the frame where its thickness is not enough so as to achieve this complex shapes.

The ring-shaped attachment area of the dome-shaped structure is further attached to the angled head (or angled fitting) by a set of bolts or fasteners.

On the other hand, the longitudinal structures of the aircraft such as longerons or beams comprise heads for accommodating each one of the extension components, that is, the heads are arranged inclined.

Since the inclined head provided by the longitudinal structures also follow the original geometry of the dome-shaped structure (as the extension components do), the load distribution is more uniform. In particular, because of their discrete location around the entire perimeter of the dome-shaped structure, the head of longitudinal structures may be curved like the perimeter they follow, or may be planar. Regardless be curved or planar, the heads are inclined according to the longitudinal dome-shaped geometry. In advantageous embodiments disclosed hereinafter, this (inclined) head is arranged on a bridging component in order to accommodate one extension component.

Each extension component is secured to a different inclined head by its attaching means. In particular embodiments, this attaching means are bolts.

These longitudinal structures primarily work in tension, while their respective webs (which connect the head to the foot) distribute the loads induced from the dome-shaped structure as shear stresses.

In a second inventive aspect, the invention provides a rear fuselage of an aircraft comprising:

a rear pressure bulkhead according to any of the embodiments of the first inventive aspect, at least one circumferential frame comprising at least a portion, this portion comprising a first foot, a first web and an angled head, the angled head being adapted to accommodate the dome-shaped structure of the rear pressure bulkhead so that the dome-shaped structure rests thereon, wherein the dome shaped structure is secured to the angled head via the ring-shaped attachment area, and a set of longitudinal structures such as beams correspondent in number and distribution with the set of built-in extension components of the rear pressure bulkhead, wherein each of these longitudinal structures comprises a head configured to accommodate an extension component so that the extension component rests thereon, wherein the extension component is secured to the head via the attachment means.

That is, unlike the prior art where the rear pressure bulkhead was located at the last frame of the forward fuselage of the aircraft (i.e., the pressurized cabin), the present invention provides a solution to displace this rear pressure bulkhead after the orbital fuselage joint connection.

To do so, the inherent geometrical structure of the rear pressure bulkhead and its attachment means to the longitudinal and circumferential structures (e.g., beams or longerons, and frame, respectively) provides a suitable load distribution which does not jeopardize the structural integrity of the assembly.

The angled head of the portion of the frame is adapted to accommodate the dome-shaped structure of the rear pressure bulkhead so that the dome-shaped structure is configured to rest thereon, being further secured thereto via its ring-shaped attachment area. On the other hand, the head of each longitudinal structure is adapted to accommodate an extension component so that the extension component rests thereon, being further secured thereto via its attachment means.

Furthermore, the distance between the last frame of the forward fuselage and the foremost frame of the rear fuselage is gained as additional pressurized area without enlarging the forward fuselage. In other words, given the forward and rear fuselage lengths as constraints, the present invention provides an advantageous solution for increasing the pressurized area without modifying the overall fuselage.

In a particular embodiment, the at least one circumferential frame comprises:

the portion wherein the head is angled, and a complementary portion comprise a second foot, a second web, and a circumferential angular fitting built-in with such second web for accommodating a corresponding portion of the dome-shaped structure so that such corresponding portion of the dome-shaped structure rests thereon, wherein the dome-shaped structure is secured to the circumferential angular fitting via the ring-shaped attachment area.

In this embodiment, the circumferential frame, depending on the covered portion of the circumference, comprises either the angled head or a circumferential angular fitting built-in with the second web. It is to be noted that both supporting structures have an angle, preferably the same angle, corresponding to the dome geometry.

Both supporting structures (i.e., the angled head or the angular fitting) cover the 360° of the circumferential frame in order to provide a continuous support dome shaped structure. That is, if the portion of the circumferential frame with the angled head covers X°, then, the complementary portion covers 360°-X°.

Similarly, both supporting structures let the dome-shaped structure be secured thereto via the ring-shaped attachment area.

To better differ the circumferential frame elements, through the portion wherein the head is angled, its foot and web may be understood as a first foot and a first web, respectively. Similarly, in the complementary portion with the circumferential angular fitting, its foot and web may be understood as a second foot and a second web, respectively.

In a preferred embodiment, the circumferential angular fitting built-in with the second web of the at least one circumferential frame is a 'V-shaped' chord. More preferably, this 'V-shaped' chord is made of titanium.

One half of the 'V-shaped' chord is built-in with the second web—of the circumferential frame complementary portion-, while the other half provides the supporting structure for the dome-shaped structure to be secured thereto by the ring-shaped attachment area.

Advantageously, this 'V-shaped' chord reacts radial loads (in terms of fuselage reference system) more effectively than other chord profiles such as 'Y-shaped' chord.

In a particular embodiment, the at least one circumferential frame is structurally split into at least: the portion wherein the head is angled, and the complementary portion with the circumferential angular fitting; wherein the former portion is wider and thicker than the latter portion of the frame, being a smooth transition between them.

Advantageously, this improves manufacturing times and eases assembly. As a further advantage, this embodiment allows to directly replace the portion wherein the head is angled, the upper portion closer to the VTP as will be seen later on, providing retrofit capabilities to the aircraft fuselage.

In particular, as this upper portion has to accommodate the rear pressure bulkhead, it is shortened in further embodiments thus saving material.

The portions of the circumferential frame may be either metallic (such as titanium) or made of composite such as Carbon Fiber Reinforced Plastic, 'CFRP.'

As it was already mentioned, the load distribution is effective due to the supporting attachment provided by the longitudinal structures of the rear fuselage.

Therefore, in a particular embodiment, at least one of the longitudinal structures comprises a tapering web with the head being arranged thereon in order to accommodate one extension component.

In this embodiment, at least one of the longitudinal structures of the aircraft (especially those adjacent to the portion of the frame comprising the angled fitting) comprise a tapering web which progressively decreases as it goes away from the rear pressure bulkhead. On top of such tapering web, there is a head (thereby inclined) for accommodating an extension component which rests thereon once installed.

This longitudinal structure(s) extends from the fuselage orbital joint towards the rear pressure bulkhead. It may be connected to the opposite section beyond the rear pressure bulkhead, or may be physically separated.

In a preferred embodiment, the free end of the tapering web of each longitudinal structure is distanced from the at least one circumferential frame so that the respective heads of these longitudinal structures project beyond the free end of the web for accommodating an extension component.

In a particular embodiment, at least one of these longitudinal structures further comprises a bridging component with the head in order to accommodate one extension component.

This longitudinal structure is arranged adjacent to the portion of the circumferential frame closer to the VTP, that is, the one with an angled head.

Since this circumferential frame is both wider and thicker, there is a higher distance from the skin to its angled head. Therefore, this bridging component acts as an extension of the longitudinal structure to reach the extension component of the rear pressure bulkhead.

Therefore, this bridging component comprises a head and two flanges projecting outwards and perpendicular to such head. The slot defined by such flanges corresponds to the thickness of the longitudinal structure web to be joined thereto.

In a particular embodiment, the rear fuselage further comprises a Vertical Tail Plane configured to be attached at least to the foot, preferably the first foot of the portion with the angled head, of the circumferential frame where the rear pressure bulkhead is accommodated and attached.

In a preferred embodiment, the Vertical Tail Plane is attached to such first foot by tension bolts.

In other words, the rear pressure bulkhead according to the present invention can be attached to the same frame than the VTP of the rear fuselage. This has been advantageously achieved thanks to the new architecture and attachments according to the invention.

Advantageously, the number of frames in the rear fuselage is reduced as there is no dedicated frame to the rear pressure bulkhead, thus saving space in the non-pressurized area.

In a particular embodiment, the at least one circumferential frame is the foremost circumferential frame of the rear fuselage. In other words, the first circumferential frame of the rear fuselage.

Advantageously, since all equipment of the non-pressurized side was already optimized in space, the rear fuselage does not need to be oversized in order to not to abut any of these equipment.

In a particular embodiment, the dome-shaped structure is configured to be secured at least to the head of the at least one circumferential frame via its ring-shaped attachment area by at least one tension bolt.

On the other side of any of defined feet, that is, opposite to their respective webs, the foot is joined to the rear fuselage skin.

In a preferred embodiment, the dome-shaped structure is configured to be secured to both, the angled head and the circumferential angular fitting of the at least one circumferential frame via its ring-shaped attachment area by at least one tension bolt.

In a particular embodiment, the at least one tension bolt projects towards the pressurized area to fasten a hook.

These hook(s) are advantageously used to fasten on-board equipment and minimize their movement.

In a third inventive aspect, the invention provides an aircraft comprising:

a forward fuselage configured to be pressurized, and
a rear fuselage according to any of the embodiments of the second inventive aspect.

All the features described in this specification (including the claims, description and drawings) and/or all the steps of the described method can be combined in any combination, with the exception of combinations of such mutually exclusive features and/or steps.

BRIEF DESCRIPTION OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

FIG. 3 shows a lateral view of the schematic architecture seen in FIG. 2a.

DETAILED DESCRIPTION OF THE PREFERRED EMBODIMENTS

Having outlined the present invention defined in the claims, specific non-limitative embodiments are described hereinafter. The person skilled in the art shall recognize that objects of the present invention may be embodied as a rear pressure bulkhead (1), a rear fuselage (10) or an aircraft fuselage.

Figure 1:
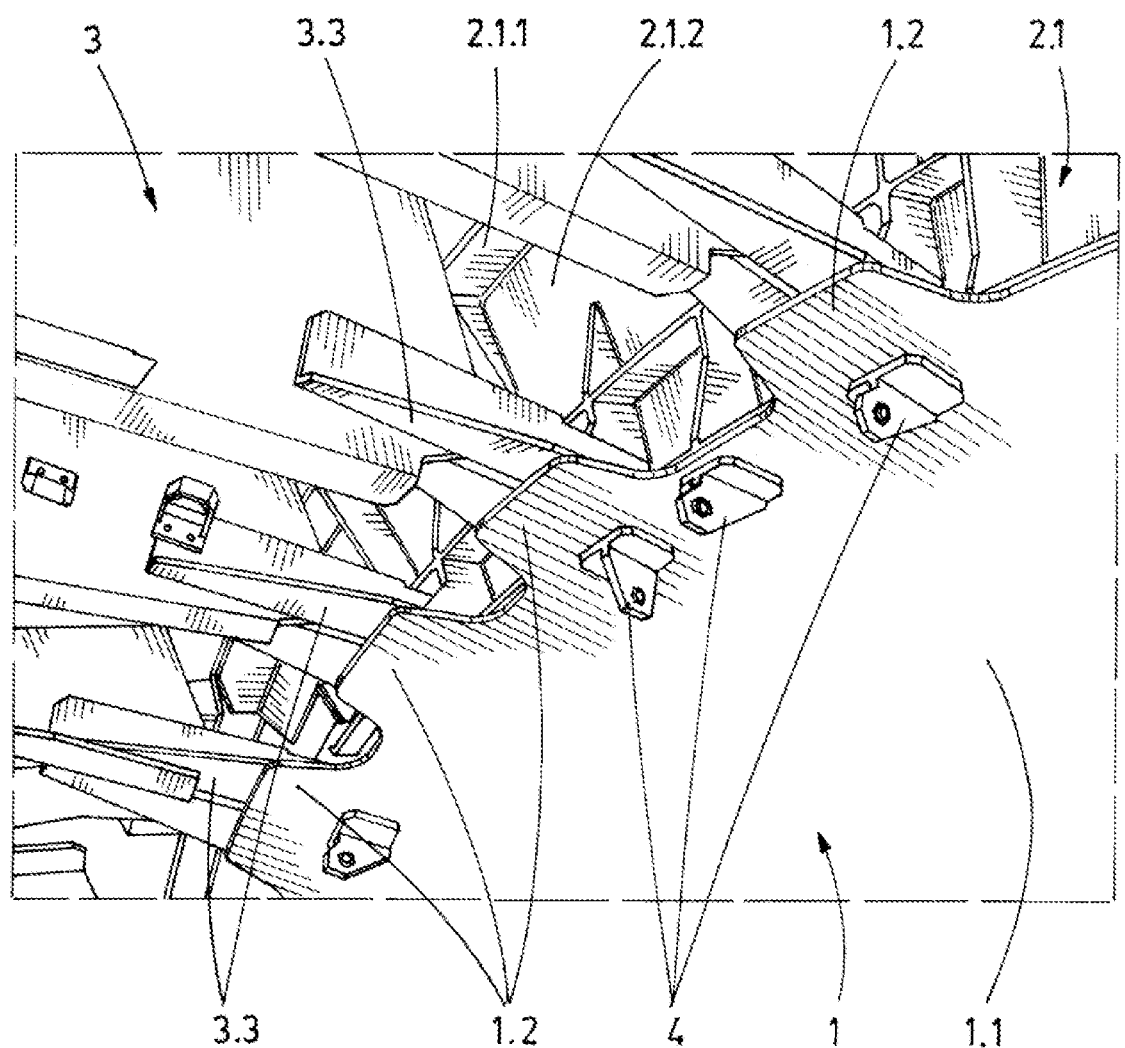
FIG. 1 shows an isometric view of a representation of the upper portion of a circumferential frame and the rear pressure bulkhead of the invention attached thereto.

FIG. 1 depicts an isometric view of the upper portion (2.1) of a circumferential frame (2) and the rear pressure bulkhead (1) according to the invention attached thereto.

As it can be seen, the rear pressure bulkhead (1) comprises:
a dome-shaped structure (1.1), and
a set of built-in extension components (1.2) homogeneously distributed along the periphery of the dome-shaped structure (1.1).

Particularly, there is a smooth transition between the dome-shaped structure (1.1) and each of the extension components (1.2), thus following the dome-curvature of this structure.

Graphically, the extension components may be seen as "petals" or "tongues" as will be illustrated and explained thereinafter.

Furthermore, the number of extension components (1.2) corresponds with the number of longitudinal structures (3) of the rear fuselage (10) in the pressurized area. Also, the width of each extension component (1.2) is similar to the head (3.4) of the longitudinal structure (3) at which it is secured to. In other words, both elements (1.2, 3.4) have an analogous area to maximize load transfer.

The extension components (1.2) comprise attachment means (1.2.1) adapted to secure each extension component (1.2) to a longitudinal structure (3) of the aircraft. Preferably, the longitudinal structures (3) to accommodate the extension components (1.2) are dedicated structures working under shear loads and that is why they are also called "shear webs," since their webs are the principal element distributing loads. Accordingly, the extension components (1.2) may be understood as "shear web attachment flanges."

Although it is not appreciated in FIG. 1, the dome-shaped structure (1.1) comprises a ring-shaped attachment area (1.1.1) adapted to secure it either to a circumferential frame (2) of the aircraft or another radial structure such as an angular fitting (2.2.3). This ring-shaped attachment area (1.1.1) extends adjacent to the whole periphery of the dome-shaped structure (1.1) for providing a continuous sealing assuring air-tightness of the rear pressure bulkhead (1).

Figure 2A:
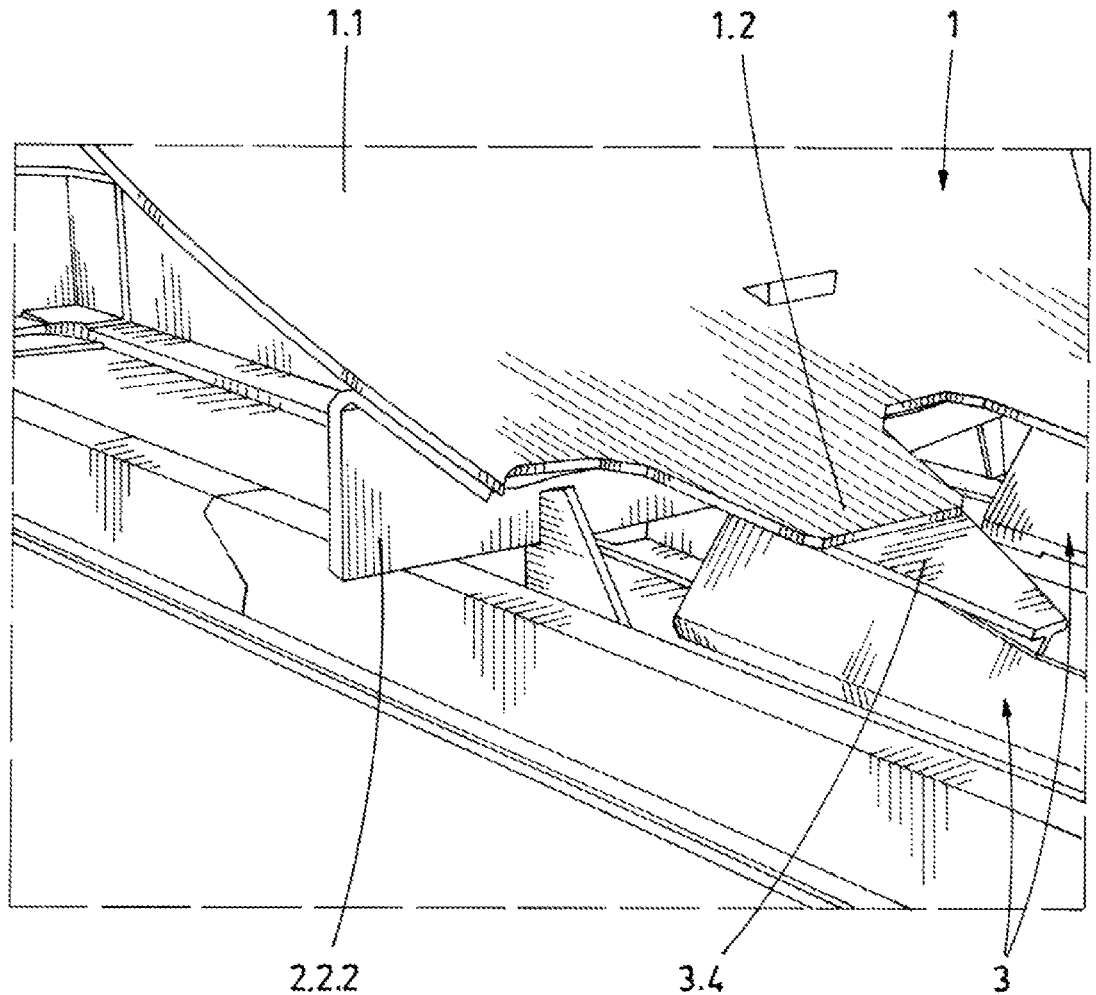
FIGS. 2a-b show (a) an isometric view of a schematic representation of the lower portion of a circumferential frame and the rear pressure bulkhead according to the invention attached thereto; and (b) a schematic representation of a sectional view.
Figure 2B:
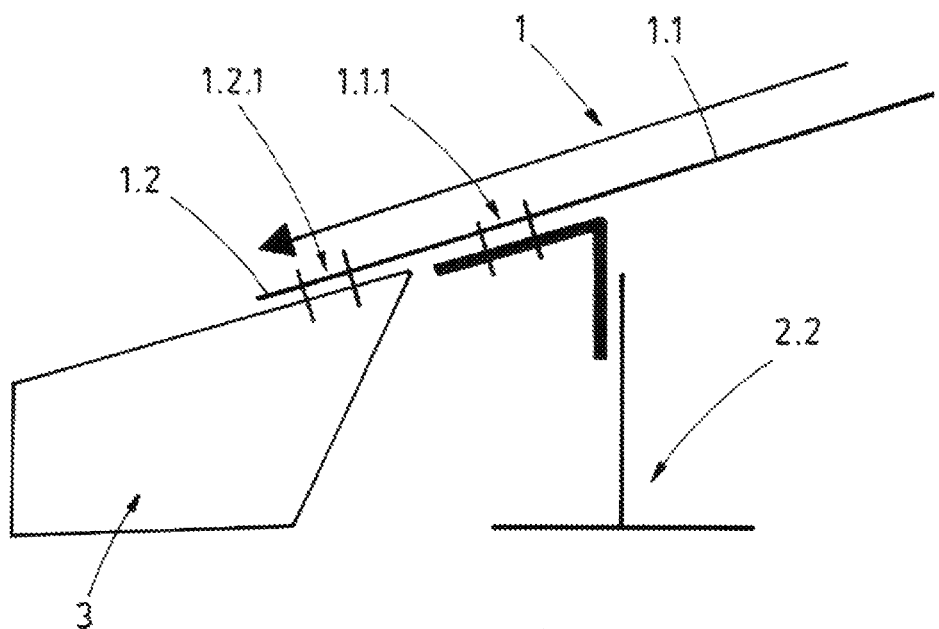

As it will be shown in conjunction with FIGS. 2a and 2b, the circumferential frame (2) wherein the rear pressure bulkhead (1) is secured, is split or divided into at least:
a portion (2.1) wherein the head (2.1.3) is angled, and
a complementary portion (2.2) wherein the circumferential frame (2) comprise a second foot (2.2.1), a second web (2.2.2), and a circumferential angular fitting (2.2.3) built-in with such second web (2.2.2).

The portion (2.1) of the frame comprising the angled head (2.1.3) is wider and thicker than the complementary portion (2.2) of the frame shown in FIG. 2a.

Terms like 'first portion' and 'second portion' may be used for identifying the portion (2.1) of the frame comprising the angled head (2.1.3), and the complementary portion (2.2), respectively.

In FIG. 1, there are further seen bridging components (3.3) with respective heads (3.4) in each longitudinal structure (3) reaching up to the corresponding extension component (1.2) for accommodating the same. This bridging component (3.3) is formed by a head (3.4) and two flanges (3.5) projecting outwards and perpendicular thereto, defining a slot that corresponds to the thickness of the longitudinal structure web (3.2).

This portion of the longitudinal structure (3) (i.e., the one with an angled head (2.1.3)) is arranged closer to the Vertical Tail Plane, VTP. The VTP, in turn, is secured by tension bolts to the first foot (2.1.1) of the frame portion (2.1) wherein the head (2.1.3) is angled.

Similarly, there can be seen in the concave side of the rear pressure bulkhead (1), i.e., the pressurized area, hooks (4) for fastening equipment.

FIG. 2a depicts an isometric view of the opposite portion of the circumferential frame (2.2) (i.e., the complementary portion to accomplish a 360° structure) and the rear pressure bulkhead (1) attached thereto. Particularly, this complementary portion (2.2) of the circumferential frame (2) comprises a second foot (2.2.1), a second web (2.2.2), and a circumferential angular fitting (2.2.3) built-in with such second web (2.2.2).

The circumferential angular fitting (2.2.3), which is built-in with the second web (2.2.2), is a titanium 'V-shaped' chord, which effectively distributes loads towards the frame web (2.2.2).

Further, longitudinal structures (3) for accommodating and securing extension components (1.2) via attachment means (1.2.1) are shown. Contrary to those shown in FIG. 1, these longitudinal structures (3) comprise a tapering web (3.2) with the head (3.4) thereon in order to accommodate one extension component (1.2).

A sectional view of a schematic representation of FIG. 2a is seen in FIG. 2b. In particular, it is seen in this section view both the dome-shaped structure (1.1) and an extension component (1.2). Furthermore, a representation of the ring-shaped attachment area (1.1.1) is seen within the dome-shaped structure (1.1), as well as attachment means (1.2.1) within the extension component (1.2).

In FIG. 2b, the arrow represents the direction of longitudinal stresses through the rear pressure bulkhead (1) for being alleviated towards the primary structure (the sum of frame (2) and longitudinal structures (3)).

Figure 3:
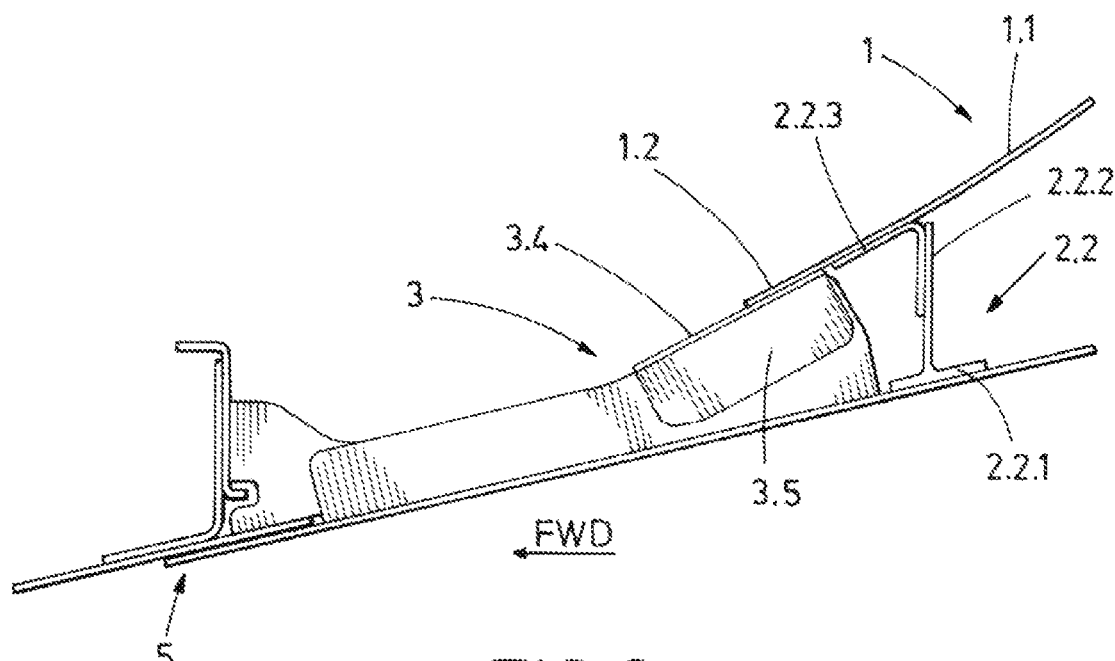

Despite the rear pressure bulkhead (1) being schematically depicted as a straight line, the curvature of a dome geometry should be expected like in FIG. 3, wherein a lateral view of the schematic architecture of FIG. 2a is seen.

In particular, in FIG. 3, as one half of the 'V-shaped' chord (2.2.3) is built-in with the second web (2.2.2) of the circumferential frame (2.1), while the other half provides the supporting structure for the dome-shaped structure (1.1) to be secured thereto by the ring-shaped attachment area (1.1.1), the curvature at this periphery tends to be less pronounced.

In particular, in some embodiments, the extension components (1.2) may be flat.

Particularly, the longitudinal structure (3) comprises a structure like the bridging component. That is, the head (3.4) is integral with two flanges (3.5) projecting perpendicular thereto, thus defining a slot that corresponds to the thickness of the longitudinal structure web (3.2). Further, such web (3.2) tapers as it goes away from the circumferential frame (2.2).

The free end, or edge, of the tapering web (3.2) of each longitudinal structure is distanced with the adjacent portion of the circumferential frame (2.2) so that the respective heads (3.4) of these longitudinal structures (3) project beyond the free end of the web (3.2) for accommodating an extension component (1.2).

Figure 4:
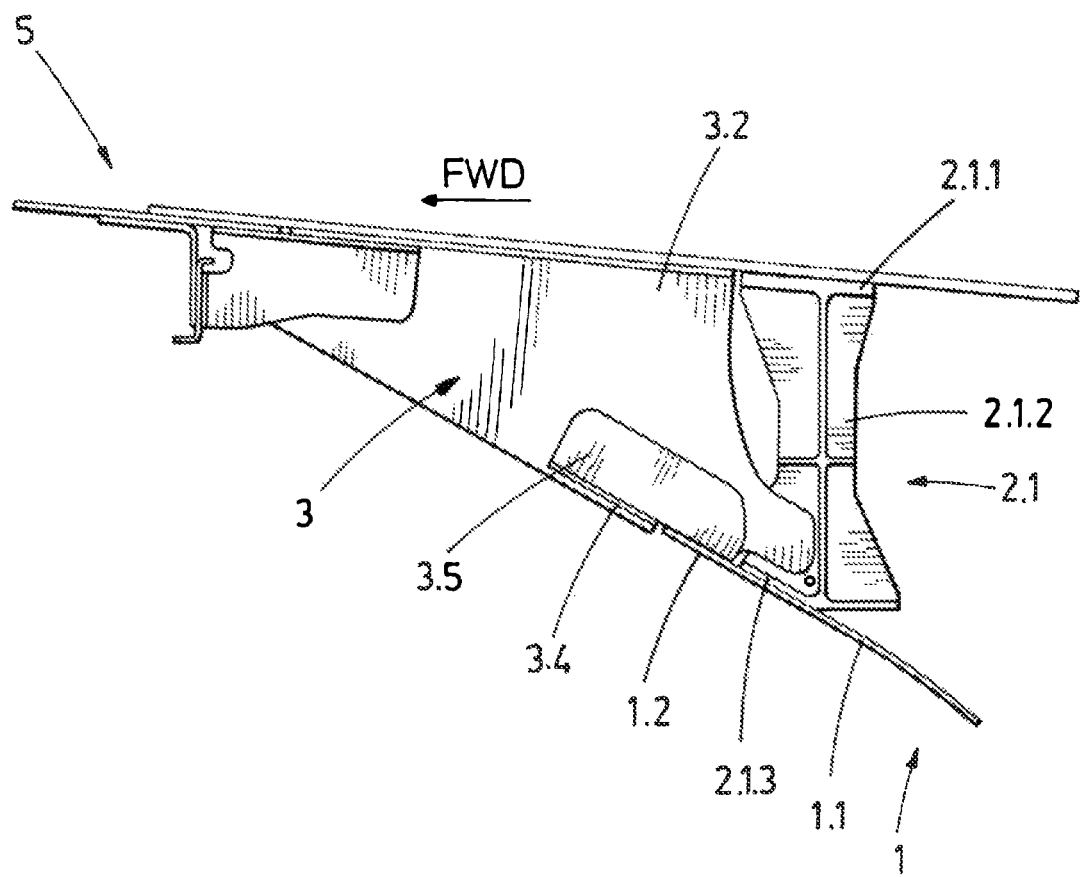
FIG. 4 shows a lateral view of the schematic architecture seen in FIG. 1.

On the contrary, in FIG. 4, it is seen that the web (3.2) projects up to the circumferential frame web (2.1.2) to strengthen the joint in the primary structure.

Both in FIGS. 3 and 4 is depicted a 'buttstrap' joint (5), wherein a plate overlaps and fastens the butted skins of the forward (11) and rear (10) fuselage together.

Advantageously, this provides a seal between these fuselages (10, 11).

Figure 5:
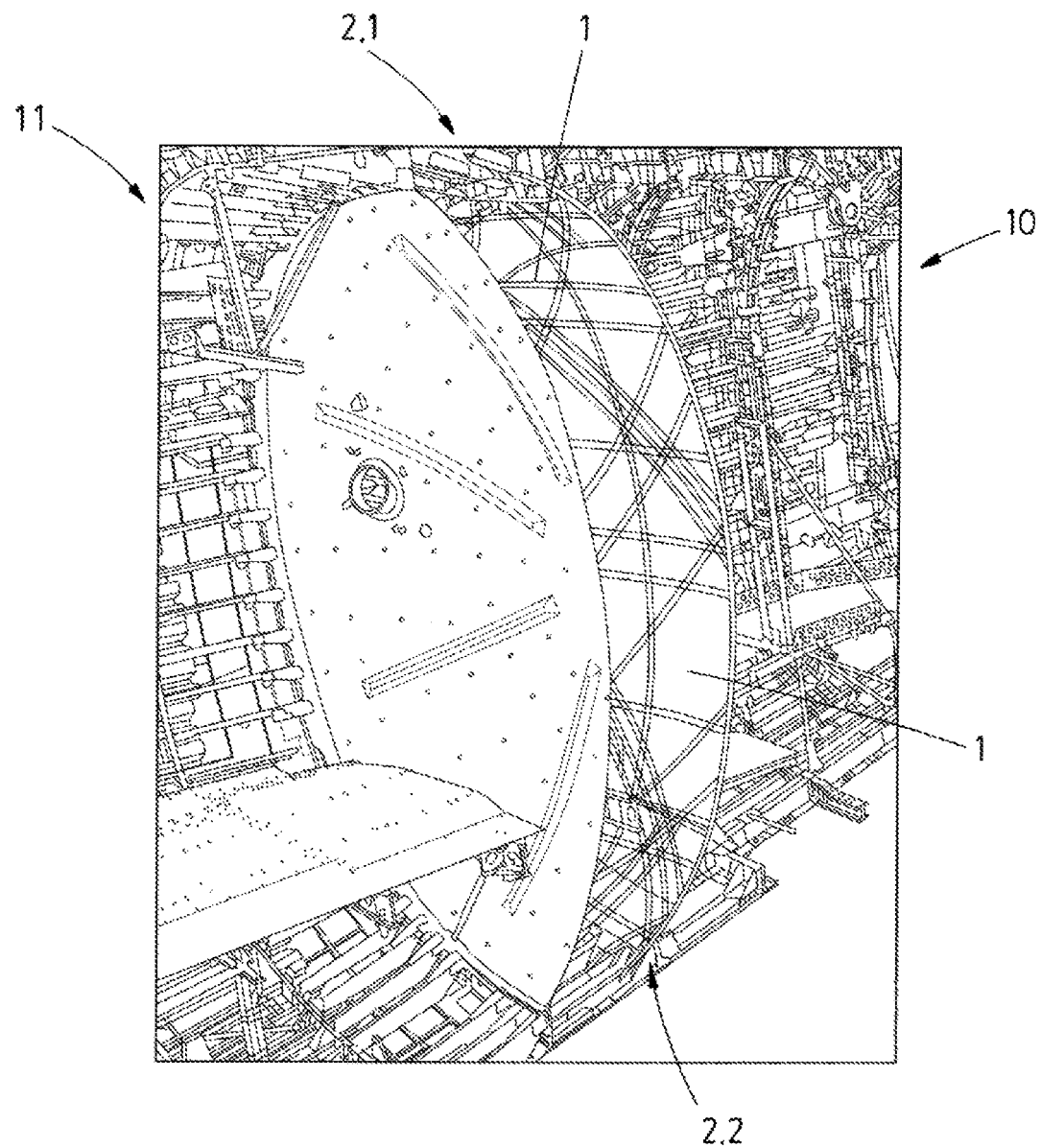
FIG. 5 shows a location comparison of a rear pressure bulkhead of the prior art and one rear pressure bulkhead according to the present invention for the same aircraft fuselage.

FIG. 5 depicts a location comparison of a rear pressure bulkhead of the prior art and one rear pressure bulkhead (1) according to the present invention for the same aircraft fuselage.

It can be seen that both rear pressure bulkheads are distanced between them, this distance corresponding to the pressurized space gained by the present invention without modifying the fuselage's length.

Particularly, the prior art rear pressure bulkhead is secured to the last circumferential frame (2) of the forward fuselage (11)—forward of the orbital fuselage joint connection-, but the rear pressure bulkhead (1) according to the present invention is secured to the foremost circumferential frame (2) of the rear fuselage (10)—rearward of the orbital fuselage joint connection-.

Further, unlike prior art rear pressure bulkheads wherein they had to be reinforced by stringers, the rear pressure bulkhead according to the present invention has a clean surface on the concave side (pressurized side, apart from the hooks) because the load distribution is effectively improved.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A rear fuselage of an aircraft comprising:
a rear pressure bulkhead comprising:
   a dome-shaped structure, and
   a set of built-in extension components distributed along a periphery of said dome-shaped structure,
   wherein the dome-shaped structure comprises a ring-shaped attachment area configured to secure the dome-shaped structure either to a circumferential frame of the aircraft or to another circumferential structure, and
   wherein the extension components comprise attachment means configured to secure each extension component to a longitudinal structure of the aircraft,
at least one circumferential frame comprising at least a portion, the portion comprising a first foot, a first web and an angled head, the angled head being configured to accommodate the dome-shaped structure of the rear pressure bulkhead so that the dome-shaped structure rests thereon,
wherein the dome-shaped structure is secured to the angled head via the ring-shaped attachment area, and
a set of longitudinal structures correspondent in number and distribution with the set of built-in extension components of the rear pressure bulkhead,
wherein each of the longitudinal structures comprises a head configured to accommodate an extension component so that said extension component rests thereon,
wherein the extension component is secured to the head via the attachment means.

2. The rear fuselage according to claim 1, wherein the at least one circumferential frame further comprises:
a complementary portion comprising a second foot, a second web and a circumferential angular fitting built-in with the second web for accommodating a corresponding portion of the dome-shaped structure so that such corresponding portion of the dome-shaped structure rests thereon,
wherein the dome-shaped structure is secured to the circumferential angular fitting via the ring-shaped attachment area.

3. The rear fuselage according to claim 2, wherein the circumferential angular fitting built-in with the second web is a 'V-shaped' chord.

4. The rear fuselage according to claim 2, wherein the at least one circumferential frame is structurally split into at least:
The portion wherein the head is angled, and
the complementary portion with the circumferential angular fitting;
wherein the portion wherein the head is angled is wider and thicker than the complementary portion of the frame, with a smooth transition between them.

5. The rear fuselage according to claim 1, wherein at least one of said longitudinal structures comprises a tapering web with the head being arranged thereon in order to accommodate one extension component.

6. The rear fuselage according to claim 5, wherein a free end of the tapering web of each longitudinal structure is distanced from the at least one circumferential frame so that the respective heads of the longitudinal structures project beyond the free end of the tapering web for accommodating an extension component.

7. The rear fuselage according to claim 1, wherein at least one of the longitudinal structures further comprises a bridging component with the head to accommodate one extension component.

8. The rear fuselage according to claim 1, further comprising a Vertical Tail Plane configured to be attached at least to the first foot of the circumferential frame where the rear pressure bulkhead is accommodated and attached, the Vertical Tail Plane being attached to such first foot by tension bolts.

9. The rear fuselage according to claim 1, wherein the at least one circumferential frame is a foremost circumferential frame of the rear fuselage.

10. The rear fuselage according to claim 1, wherein the dome-shaped structure is configured to be secured at least to a head of the at least one circumferential frame via its ring-shaped attachment area by at least one tension bolt.

11. The rear fuselage according to claim 10, wherein the at least one tension bolt projects towards the pressurized area to fasten a hook.

12. An aircraft comprising:
a forward fuselage configured to be pressurized, and
a rear fuselage according to claim 1.

13. The rear fuselage according to claim 1, wherein the longitudinal structures comprises beams.

14. A fuselage of an aircraft comprising:
a rear pressure bulkhead comprising:
    a dome-shaped structure, wherein the dome-shaped structure comprises a ring-shaped attachment area, and
    a set of built-in extension components distributed along a periphery of said dome-shaped structure; and
at least one circumferential frame comprising a first foot, a first web and an angled head, the angled head being configured to accommodate the dome-shaped structure of the rear pressure bulkhead so that the dome-shaped structure rests thereon, wherein the dome- shaped structure is secured to the angled head via the ring-shaped attachment area; and
a set of longitudinal structures correspondent in number and distribution with the set of built-in extension components of the rear pressure bulkhead,
wherein each of the longitudinal structures comprises a head configured to accommodate an extension component so that said extension component rests thereon,
wherein the extension component is secured to the head,
wherein the rear pressure bulkhead has a concave side and a convex side, the concave side comprising at least one hook.

* * * * *